United States Patent
Lee et al.

(10) Patent No.: US 10,330,822 B2
(45) Date of Patent: Jun. 25, 2019

(54) PROXIMITY SENSING DEVICE AND OPTICAL SENSING CIRCUIT HAVING PROXIMITY SENSING FUNCTION

(71) Applicant: DYNA IMAGE CORP., New Taipei (TW)

(72) Inventors: Sheng-Cheng Lee, New Taipei (TW); Wen-Sheng Lin, New Taipei (TW); Shih-Hao Lan, New Taipei (TW)

(73) Assignee: DYNA IMAGE CORP. (TW)

( * ) Notice: Subject to any disclaimer, the term of this patent is extended or adjusted under 35 U.S.C. 154(b) by 209 days.

(21) Appl. No.: 15/482,805

(22) Filed: Apr. 9, 2017

(65) Prior Publication Data

US 2018/0120475 A1    May 3, 2018

(30) Foreign Application Priority Data

Oct. 28, 2016   (CN) .......................... 2016 1 0964129

(51) Int. Cl.
*G01V 8/12*    (2006.01)

(52) U.S. Cl.
CPC ..................... *G01V 8/12* (2013.01)

(58) Field of Classification Search
CPC ... G01V 8/10; G01V 8/12; G01V 8/14; G01V 8/16; G01V 8/18; G01V 8/20; G01V 8/22; G01V 8/24; G01V 8/26; G01J 1/4204; G01J 1/44; G01J 2001/444; G01J 2001/4446; G01J 2001/446; H03K 17/945; H03K 2017/9455; H03K 17/9627; H03K 17/9629; H03K 17/9631; H03K 2017/9634; H03K 17/9636; H03K 17/9638

See application file for complete search history.

(56) References Cited

U.S. PATENT DOCUMENTS

| | | | |
|---|---|---|---|
| 2015/0207014 A1* | 7/2015 | Inoue | H01L 31/167 345/102 |
| 2016/0070358 A1* | 3/2016 | Trattler | G06F 3/017 345/175 |
| 2016/0178735 A1* | 6/2016 | Shirasaka | G01S 17/026 356/614 |
| 2018/0120475 A1* | 5/2018 | Lee | G01V 8/12 |
| 2018/0123513 A1* | 5/2018 | Lin | H03B 5/26 |
| 2018/0266879 A1* | 9/2018 | Lee | G01J 1/4204 |

\* cited by examiner

*Primary Examiner* — John R Lee

(57) ABSTRACT

Differing from conventional optical sensing device used in smart phones often lacks self-calibration function, a novel proximity sensing device having self-calibration function is disclosed by the present invention, and comprises: a driving module, a lighting element, a first a light receiving module, a conversion module, a judge circuit, a synchronous sequential module, an analog front-end module, and an analog-to-digital convertor. When executing a noise calibration process, a sensing signal outputted from the first light receiving module is converted to a voltage signal by the conversion signal comprising a signal-amplifying MOSFET, a current mirror circuit, N number of cascode MOSFET pairs, and a current-to-voltage converting resistor. After that, the voltage is transmitted to the judge circuit, and then the noise calibration process would be completed under the cooperation of the judge circuit, the synchronous sequential module, and the analog front-end module.

17 Claims, 8 Drawing Sheets

PROXIMITY SENSING DEVICE AND OPTICAL SENSING CIRCUIT HAVING PROXIMITY SENSING FUNCTION

BACKGROUND OF THE INVENTION

1. Field of the Invention

The present invention relates to the technology field of electronic circuits, and more particularly to a proximity sensing device and an optical sensing circuit having proximity sensing function.

2. Description of the Prior Art

With the high development of smart phones, mobile phones are not limited to be a simple communication tool, especially that more and more advanced technologies such as AR (Augmented Reality) and VR (Virtual Reality) are implemented in the smart phones. There are several sensors disposed in a commercial smart phone, including ambient light sensor, proximity sensor, G-sensor, accelerometer sensor, magnetism sensor, gyroscope, and global positioning system (GPS). Moreover, some high-end smart phones may further disposed with at least one physiological sensor for monitoring or collecting personal physiological data, like pulse oximeter, heart rate sensor, and fingerprint sensor.

Referring to FIG. 1, which illustrates a top view of an iPhone. Moreover, please simultaneously refer to FIG. 2, where a cross-sectional diagram of a package structure of an ambient light sensor and a proximity sensor is provided. As FIG. 1 and FIG. 2 show, ambient light sensor and proximity sensor are often integrated to a single optical sensing module 2'. The single optical sensing module 2' comprises a circuit substrate 21', a lighting element 22', a light receiving element 23', and a controlling and processing unit, wherein the circuit substrate 21' is disposed on a main board 10' of the iPhone 1'. Moreover, the controlling and processing unit, the lighting element 22' and the light receiving element 23' are accommodated in a packaging housing 26' having a light inlet opening 25' and a light outlet opening 24'.

What is worth noting is that a light inlet aperture 13' and a light outlet aperture 12' are formed near the phone receiver 11' of the iPhone 2'. During operation of the optical sensing module 2', the light receiving element 23' is configured to detect and receive an ambient light 152' via the light inlet aperture 13'; therefore, according to intensity variation of the ambient light 152', it is facilitated that the controlling and processing informs a main controlling circuitry on the main board 10' to properly adjust the backlight brightness of a touch screen of the iPhone 1'. Moreover, during operation of the optical sensing module 2', controlling and processing unit would drive the lighting element 22' to emit an object-detecting light to an external object 3' through the light outlet aperture 12', so as to facilitate a first reflective light 32' from the object 3' be received by the light receiving element 23'. Thus, after treating the current signal outputted from the light receiving element 23' with a signal converting process and at least one mathematical manipulation, the controlling and processing unit obtain a distance between the object 3' and the phone receiver 11' of the iPhone 1'. To further explain the functionality of the optical sensing module 2', when user puts the phone receiver 11' in close proximity corresponds to his ear (i.e., the aforesaid object 3'), the controlling and processing unit would inform the main controlling circuitry on the main board 10' to switch off the touch screen of the iPhone 1' for preventing user's face accidentally touch the touch screen.

It needs to further explain that, a cover 15' made of glass or acrylic is disposed over the packaging housing 26', and the cover 15' would produce a second reflective light 151' when the lighting element 22' emit the object-detecting light 31' to the object 3'. As a result, after the light receiving element 23' receives the second reflective light 151' and the first reflective light 32' at the same time, the second reflective light 151' becomes a crosstalk noise and makes the controlling and processing unit fail to correctly calculate an exact distance between the object 3' and the phone receiver 11' of the iPhone 1'. In addition, it is found that the light receiving element 23' would also simultaneously receive the ambient light 152', such that the ambient light 152' may become another impact factor to cause the fail to correctly calculate the exact distance between the object 3' and the phone receiver 11' of the iPhone 1'.

Through above descriptions, it can understand that, to facilitate the touch screen of the iPhone 1' can be automatically switched off under the condition of user putting the phone receiver 11' in close proximity corresponds to his ear, the optical sensing module 2' integrated in the iPhone 1' must has the function or ability to eliminate the crosstalk noise comprising the second reflective light 151' and the ambient light 152'. For above reasons, the inventors of the present application have made great efforts to make inventive research thereon and eventually provided a proximity sensing device and an optical sensing circuit having proximity sensing function.

SUMMARY OF THE INVENTION

The primary objective of the present invention is to provide a proximity sensing device. Differing from conventional optical sensing device used in smart phones often lacks self-calibration function, a novel proximity sensing device having self-calibration function is disclosed by the present invention, and comprises: a driving module, a lighting element, a first a light receiving module, a conversion module, a judge circuit, a synchronous sequential module, an analog front-end module, and an analog-to-digital convertor. When executing a noise calibration process, a sensing signal outputted from the first light receiving module is converted to a voltage signal by the conversion signal comprising a signal-amplifying MOSFET, a current mirror circuit, N number of cascode MOSFET pairs, and a current-to-voltage converting resistor. After that, the voltage is transmitted to the judge circuit, and then the noise calibration process would be completed under the cooperation of the judge circuit, the synchronous sequential module, and the analog front-end module.

In order to achieve the primary objective of the present invention, the inventor of the present invention provides one embodiment for the proximity sensing device, comprising:

a control circuit;

a driving module, being coupled to the control circuit;

a lighting element, being coupled to the driving module for emitting an object-detecting light to an external object based on the controlling of the driving module;

a light receiving module, being used for receiving a reflective light from the object and an ambient light;

a conversion module, being coupled to the light receiving module and comprising:

a signal-amplifying MOSFET, being coupled to a control signal by the gate terminal thereof;

a current mirror circuit, being configured as an active load of the signal-amplifying MOSFET and comprising a first MOSFET and a second MOSFET; wherein the gate terminal of the first MOSFET is coupled to the gate terminal of the second MOSFET, and the source terminal of the first MOSFET and the source terminal of the second MOSFET being coupled to a bias voltage; moreover, the drain terminal and the gate terminal of the first MOSFET being coupled to each other, and the drain terminal of the second MOSFET being coupled to the source terminal of the signal-amplifying MOSFET;

N number of cascode MOSFET pairs, wherein each of the cascode MOSFET pairs comprises an upper MOSFET and a lower MOSFET, and the gate terminal and the source terminal of the upper MOSFET being respectively coupled to the gate terminal of the second MOSFET and the bias voltage; moreover, the source terminal and the drain terminal of the lower MOSFET being individually coupled to the drain terminal of the upper MOSFET and the drain terminal of the signal-amplifying MOSFET; furthermore, the gate terminal of the lower MOSFET being coupled to a switch controlling signal; and a current-to-voltage converting resistor, being coupled to a common connection point of the drain terminal of the signal-amplifying MOSFET and the drain terminal of the lower MOSFET;

a judge circuit, being coupled to the common connection point;

a synchronous sequential module, being coupled to the control circuit and the judge circuit;

an analog front-end module, being coupled to the synchronous sequential module and the light receiving module, and outputting an analog signal to the judge circuit based the controlling of the control circuit; and an analog-to-digital convertor, being coupled to the analog front-end module and outputting a digital signal to the control circuit.

Moreover, for achieving the primary objective of the present invention, the inventor of the present invention further provides one embodiment for the optical sensing circuit having proximity sensing function, wherein the said optical sensing circuit is applied in an electronic device having display and comprises:

a control circuit;

a driving module, being coupled to the control circuit;

a lighting element, being coupled to the driving module for emitting an object-detecting light to an external object based on the controlling of the driving module;

a first light receiving module, being used for receiving a reflective light from the object and an ambient light;

a second light receiving module, being used for receiving the ambient light;

a conversion module, being coupled to the light receiving module and comprising:

a signal-amplifying MOSFET, being coupled to a control signal by the gate terminal thereof;

a current mirror circuit, being configured as an active load of the signal-amplifying MOSFET and comprising a first MOSFET and a second MOSFET; wherein the gate terminal of the first MOSFET is coupled to the gate terminal of the second MOSFET, and the source terminal of the first MOSFET and the source terminal of the second MOSFET being coupled to a bias voltage; moreover, the drain terminal and the gate terminal of the first MOSFET being coupled to each other, and the drain terminal of the second MOSFET being coupled to the source terminal of the signal-amplifying MOSFET;

N number of cascode MOSFET pairs, wherein each of the cascode MOSFET pairs comprises an upper MOSFET and a lower MOSFET, and the gate terminal and the source terminal of the upper MOSFET being respectively coupled to the gate terminal of the second MOSFET and the bias voltage; moreover, the source terminal and the drain terminal of the lower MOSFET being individually coupled to the drain terminal of the upper MOSFET and the drain terminal of the signal-amplifying MOSFET; furthermore, the gate terminal of the lower MOSFET being coupled to a switch controlling signal; and a current-to-voltage converting resistor, being coupled to a common connection point of the drain terminal of the signal-amplifying MOSFET and the drain terminal of the lower MOSFET;

a judge circuit, being coupled to the common connection point;

a synchronous sequential module, being coupled to the control circuit and the judge circuit;

an analog front-end module, being coupled to the synchronous sequential module and the light receiving module, and outputting an analog signal to the judge circuit based the controlling of the control circuit; and an analog-to-digital convertor, being coupled to the analog front-end module and outputting a digital signal to the control circuit.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a proximity sensing device and an optical sensing circuit having proximity sensing function according to the present invention, embodiments of the present invention will be described in detail with reference to the attached drawings hereinafter.

Embodiment for the Proximity Sensing Device

Figure 1:
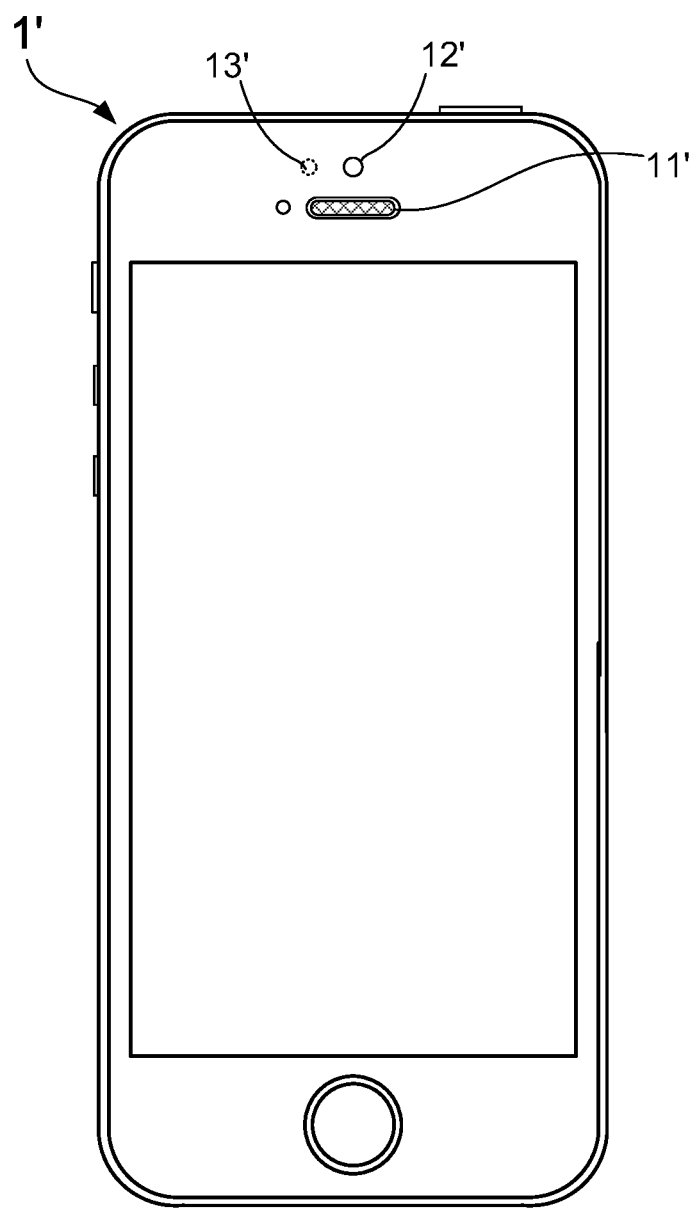
FIG. 1 shows a top view of an iPhone.
Figure 2:
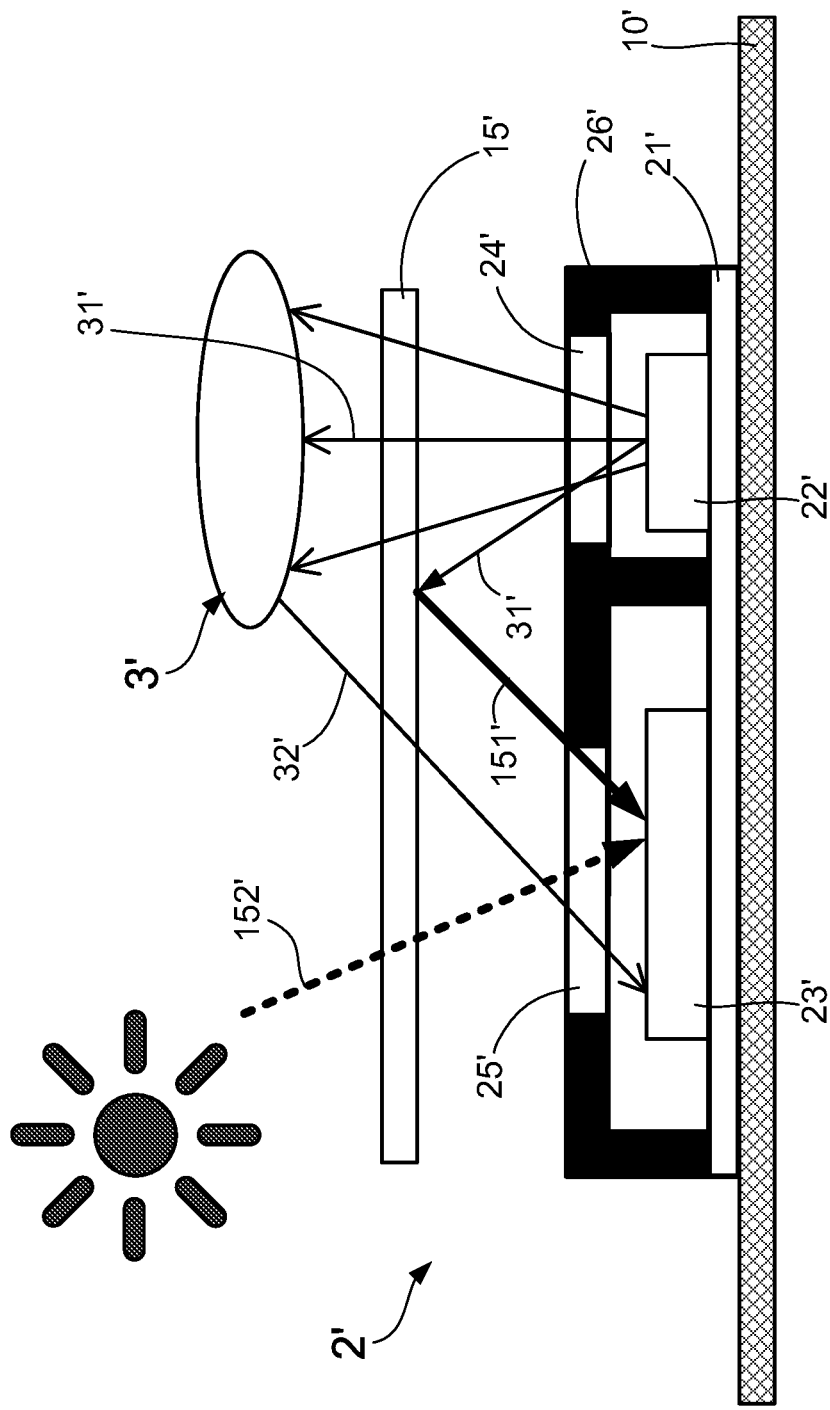
FIG. 2 shows a cross-sectional diagram of a package structure of an ambient light sensor and a proximity sensor.
Figure 3:
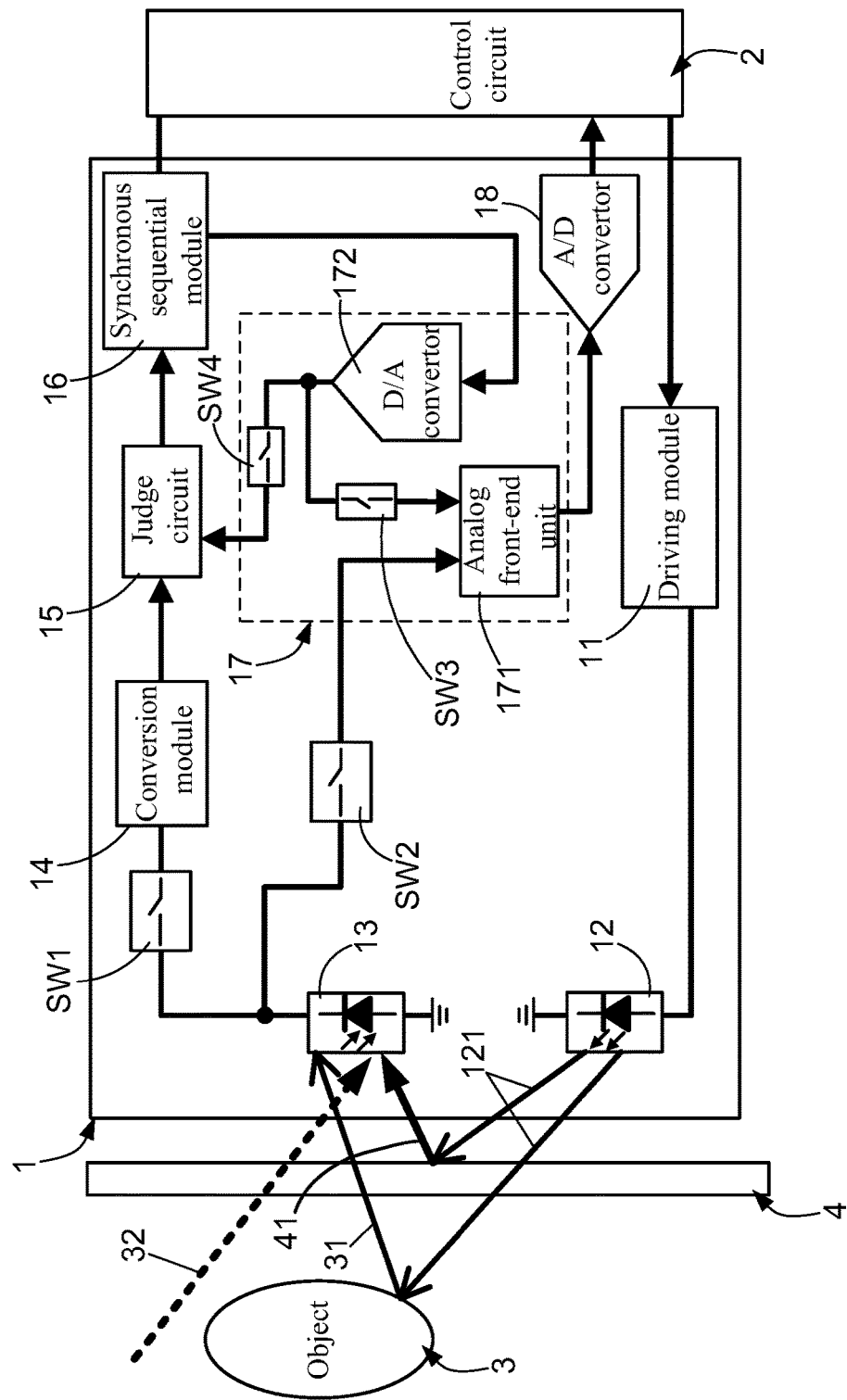
FIG. 3 shows a circuit architecture diagram of a proximity sensing device according to the present invention.

Please refer to FIG. 3, there is illustrated a circuit architecture diagram of a proximity sensing device according to the present invention. The proximity sensing device 1 of the present invention is mainly applied in an electronic device like a smart phone, used for monitoring whether a user's ear comes close to a phone receiver of the smart phone or not. When the user puts the phone receiver in close proximity corresponds to his ear, the proximity sensing device 1 would inform the main controlling circuitry of the smart phone to switch off the touch screen. Herein, it is sure that the proximity sensing device 1 is not limited to be applied in the smart phone, but also can applied in other electronic device; for example, a tablet PC. So that, object 3 shown in FIG. 3 can be regarded as a user's ear in the embodiment of the proximity sensing device 1. On the other hand, cover plate 4 shown in FIG. 3 can be an acrylic plate belonging to the packaging structure of the proximity sensing device 1. Moreover, the glass plate disposed on the top of the smart phone can also be used as the said cover plate 4.

The proximity sensing device 1 of the present invention mainly comprises: a control circuit 2, a driving module 11, a lighting element 12, a first a light receiving module 13, a conversion module 14, a judge circuit 15, a synchronous sequential module 16, an analog front-end module 17, and an analog-to-digital convertor 18, wherein the control circuit is a micro control unit (MCU). Moreover, the lighting element 12 can be a light-emitting diode (LED) or an organic light-emitting diode (OLED), which is coupled to the driving module 11 for emitting an object-detecting light 121 (such as an infrared light) to the object 3 based on the controlling of the driving module 11.

When the proximity sensing device 1 of the present invention is operated in a normal operation mode, the first light receiving module 13 is configured to receive a first reflective light 31 from the object 3 and an ambient light such as sunlight, so as to output a first signal. In this time, a first switch SW1 coupled between the first light receiving module 13 and the conversion module 14 is switched to open circuit, and a second switch SW2 coupled between the first light receiving module 13 and the analog front-end module 17 is switched to short circuit. Briefly speaking, the first signal of the first light receiving module 13 is merely outputted to the analog front-end module 17 instead of the conversion module 14.

Figure 4A:
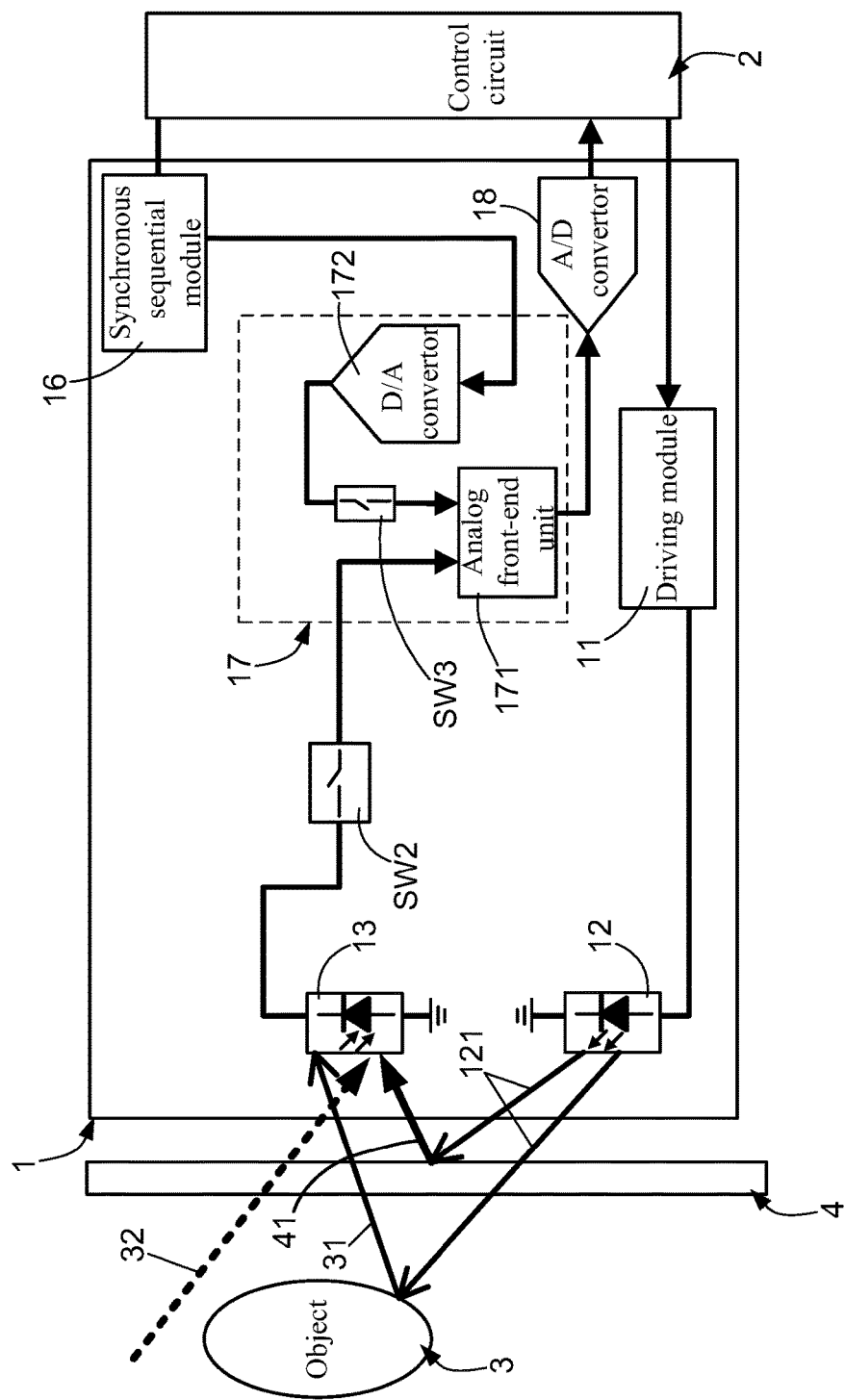
FIG. 4A shows a circuit configuration view of the proximity sensing device according operated under the normal operation mode.

Continuously referring to FIG. 3, and please simultaneously refer to FIG. 4A, which illustrates a circuit configuration view of the proximity sensing device according operated under the normal operation mode. Before explaining the normal operation mode of the proximity sensing device 1, it needs to define the output signal and input signal of each of the circuit units of the proximity sensing device 1, such that misreads or misunderstandings for the technology features of the proximity sensing device 1 can be prevented from occurring. For instance, when the fourth switch SW4 is switched to short circuit, a digital-to-analog convertor 172 in the analog front-end module 17 outputs an analog signal to the judge circuit 15, but the digital-to-analog convertor 172 also outputs an analog signal to an analog front-end unit 171 in the analog front-end module 17 as the third switch is switch to short circuit. It is worth noting that, it is very difficult to distinguish the two analog signals because these two may be identical or different. However, the definitions of output signal and input signal of the circuit units provided in following Table (1) are help to understand meanings of all signals.

TABLE 1

| Circuit module (unit) | Input signal | Output signal |
|---|---|---|
| Driving module 11 | Control signal outputted by control circuit | DC signal or PWM signal used for driving the illumination of the lighting element 12 |
| Light receiving module 13 | First reflective light 31 from the object 3, ambient light 32, and second reflective light 41 from the cover plate 4 | First signal |
| Conversion module 14 | First signal | Second signal |
| Judge circuit 15 | Second signal | Third signal |
| Synchronous sequential module 16 | Third signal | Fourth signal |
| Analog front-end module 17 | Fourth signal and first signal | Fifth signal or sixth signal |
| Analog-to-digital convertor 18 | Sixth signal | Seventh signal |
| Digital-to-analog convertor 172 | Fourth signal | Eighth signal |
| Analog front-end unit 171 | First signal and eight signal | Fifth signal or sixth signal |

From FIG. 3 and FIG. 4A, it is able to know that the proximity sensing device can be switched to be operated in a normal operation mode by switching the first switch SW1 and the fourth switch SW4 to open circuit as well as switching the second switch SW2 and the third switch SW3 to short circuit. In the normal operation mode, the analog front-end unit 171 is coupled to the first light receiving module 13 through the second switch SW2 for receiving a first signal. In this time, the control circuit outputs a fourth signal to the digital-to-analog convertor 172 through the synchronous sequential module 16, and then the digital-to-analog convertor 172 outputs an eighth signal to the analog front-end unit 171. After processing the first signal based on a fourth signal from the Synchronous sequential module 16, the analog front-end unit 171 subsequently outputs a sixth signal to the analog-to-digital convertor 18, and the analog-to-digital convertor 18 next outputs a seventh signal to the control circuit 2.

Engineers skilled in the development and manufacture of proximity sensing circuits would know that the noise source of the proximity sensing device 1 includes: second reflective light 41 from the cover plate 41, ambient light 32 (such as sunlight), and leakage current of the lighting element 12. Therefore, in order to calibrate the noises including the ambient light 32 and the leakage current, it must switch the proximity sensing device 1 to be operated in a normal operation mode by switching the first switch SW1 and the fourth switch SW4 to short circuit as well as switching the second switch SW2 and the third switch SW3 to open circuit.

Figure 4B:
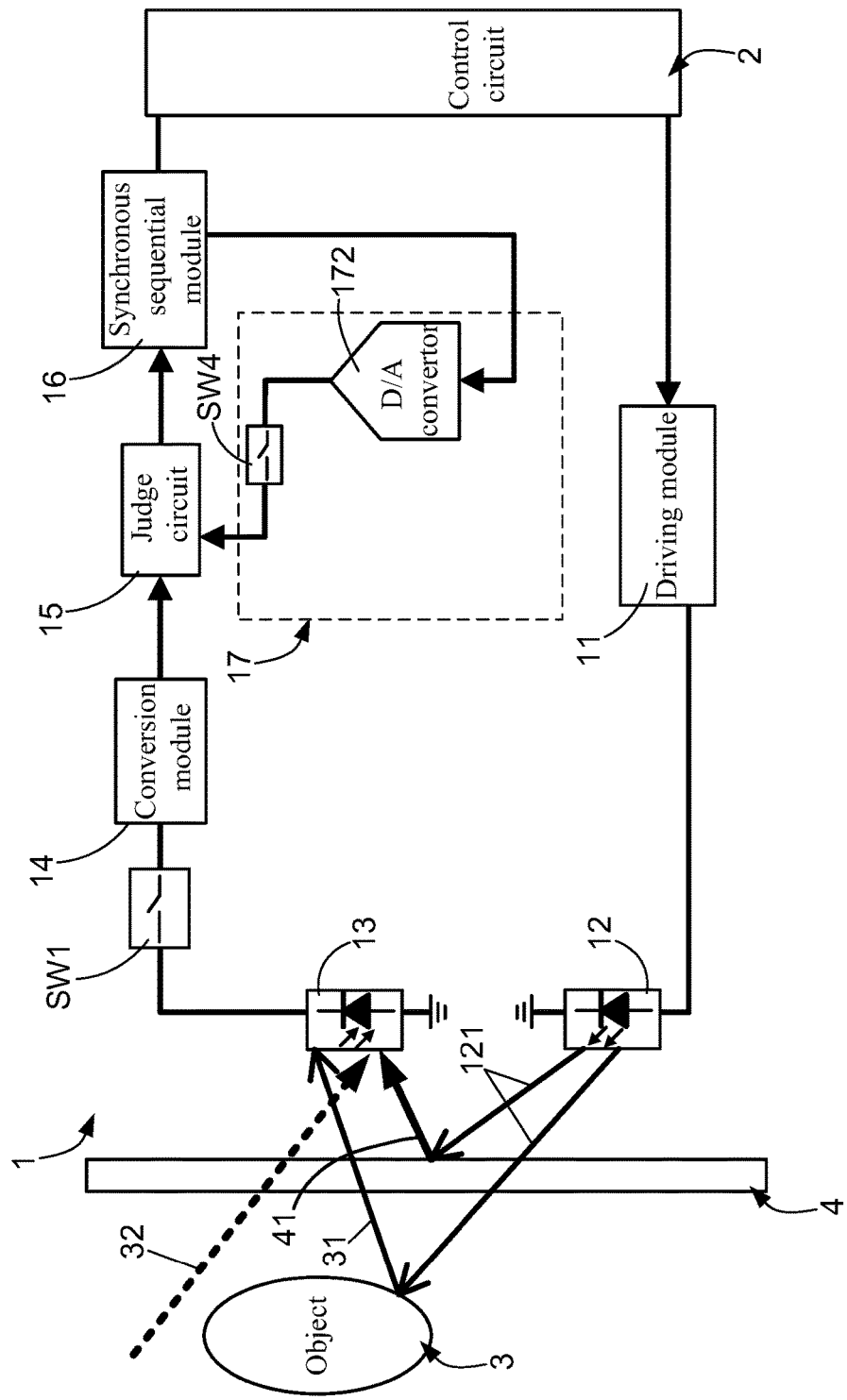
FIG. 4B shows a circuit configuration view of the proximity sensing device according operated under the calibration mode.

Continuously referring to FIG. 3, and please simultaneously refer to FIG. 4B, which illustrates a circuit configuration view of the proximity sensing device according operated under the calibration mode. In calibration mode, the first light receiving module 13 outputs the first signal to the conversion module 14 after receiving the ambient light 32. In this time, the conversion module 14 converts the first signal to a second signal for being outputted to the judge circuit 15, and the digital-to-analog convertor 172 receives the fourth signal from the synchronous sequential module 16. Subsequently, the digital-to-analog convertor 172 outputs an analog signal (i.e., the sixth signal) to the judge circuit 15 through the fourth switch SW4; and then, based on the received second signal and the eighth signal, the judge circuit 15 outputs a judge result to the control circuit 2 through the synchronous sequential module 16.

Figure 5:
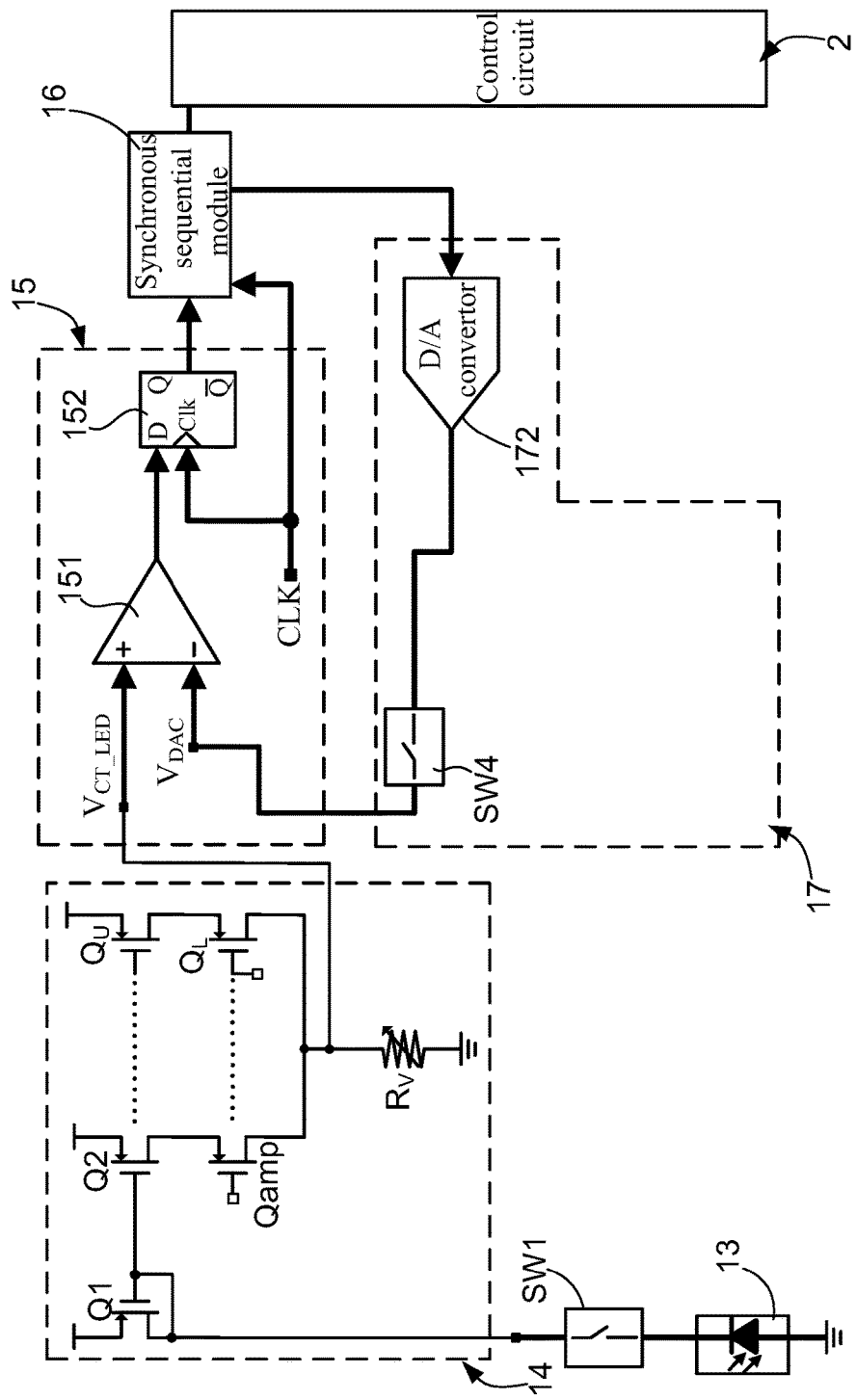
FIG. 5 shows a diagram including internal circuit arrangement of the conversion module and the judge circuit.

Contiguously referring to FIG. 4B, and please simultaneously refer to FIG. 5, where a diagram including internal circuit arrangement of the conversion module and the judge circuit is provided. In the present invention, the conversion module 14 comprises: a signal-amplifying MOSFET $Q_{amp}$, a current mirror circuit, N number of cascode MOSFET pairs, and a current-to-voltage converting resistor $R_V$. As FIG. 4B shows, the current-to-voltage converting resistor $R_V$ is a variable resistor, and the gate terminal of the signal-amplifying MOSFET $Q_{amp}$ is coupled to a control signal generated from the control circuit 2. On the other hand, the current mirror circuit is configured as an active load of the signal-amplifying MOSFET $Q_{amp}$ and comprising a first MOSFET $Q_1$ and a second MOSFET $Q_2$. Moreover, the gate terminal and the drain terminal of the first MOSFET $Q_1$ are coupled to each other, and the drain terminal of the second MOSFET $Q_2$ is coupled to the source terminal of the signal-amplifying MOSFET $Q_{amp}$. It is worth noting that, the source terminal of the first MOSFET $Q_1$ and the source terminal of the second MOSFET $Q_2$ are coupled to a bias voltage.

As FIG. 5 shows, each of the cascode MOSFET pairs comprise an upper MOSFET $Q_U$ and a lower MOSFET $Q_L$, and the gate terminal and the source terminal of the upper MOSFET $Q_U$ are respectively coupled to the gate terminal of the second MOSFET $Q_2$ and the bias voltage. Moreover, the source terminal and the drain terminal of the lower MOSFET $Q_L$ are individually coupled to the drain terminal of the upper MOSFET $Q_U$ and the drain terminal of the signal-amplifying MOSFET $Q_{amp}$. Furthermore, the gate terminal of the lower MOSFET $Q_L$ is coupled to a switch controlling signal.

It is worth explaining that, the current-to-voltage converting resistor $R_V$ is coupled to a common connection point of the drain terminal of the signal-amplifying MOSFET $Q_{amp}$ and the drain terminal of the lower MOSFET $Q_L$. On the other hand, the judge circuit 15 comprises a comparator 151 and a D flip-flop 152, wherein the one input terminal of the comparator 151 is coupled to the common connection point in the conversion module 14 and the other input terminal thereof is coupled to the analog front-end module 17. Moreover, the D flip-flop 152 is coupled to the output terminal of the comparator 151 by one signal input terminal thereof, and another one signal input terminal of the D flip-flop 152 is coupled to a clock signal. In addition, the synchronous sequential module 16 is coupled to an output terminal of the D flip-flop 152 and the clock signal.

In the calibration mode, the first signal (i.e., the detection signal of the ambient light 32 and the leakage current) would be amplified by the signal-amplifying MOSFET $Q_{amp}$; subsequently, the conversion module 14 converts the amplified first signal to a second signal for being outputted to the comparator 151. From FIG. 4B and FIG. 5, it is found that a comparison process is applied to the second signal ($V_{CT\_LED}$) and an eighth signal outputted by the digital-to-analog convertor 172 by the comparator 151, and then a specific signal representing comparison result is outputted from the comparator 151 to the D flip-flop 152. In the present invention, the D flip-flop 152 is used as a register for temporarily storing the comparison result, so as to transmit the comparison result to the synchronous sequential module 16 based on the controlling of a clock signal. In the present invention, the synchronous sequential module 16 is a finite state machine (FSM) and also controlled by the clock signal.

Figure 6:
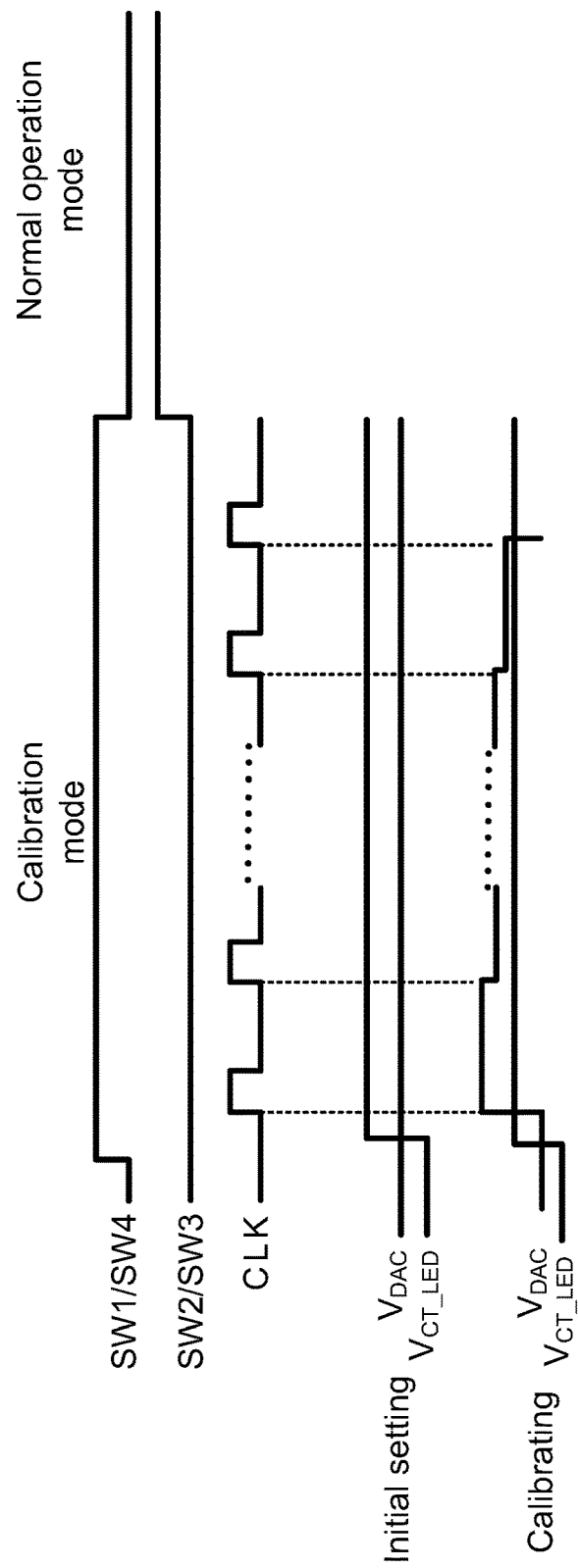
FIG. 6 shows a timing diagram of the signals.

Continuously referring to FIG. 4B and FIG. 5, and please simultaneously refer to FIG. 6, which illustrates a timing diagram of the signals. To calibrate the noises, it must firstly set the signal level of the second signal ($V_{CT\_LED}$) by enabling one or more cascode MOS pairs as well as modulating the resistance of the current-to-voltage converting resistor $R_V$. Moreover, the signal level of the eighth signal ($V_{DAC}$) is set to be lower than the signal level of the second signal ($V_{CT\_LED}$).

After the settings of the second signal and the eighth signal are finished, the noise calibration process can be subsequently carried out by the cooperation of the judge circuit 15, the synchronous sequential module 16, and the digital-to-analog convertor 172. At the beginning of the noise calibration process, the digital-to-analog convertor 172 would output first one eighth signal ($V_{DAC}$) to the comparator 151; for example an eighth signal with signal level of 0.005V. Meanwhile, if the signal level of the second signal ($V_{CT\_LED}$) is greater than the eighth signal's, the comparator 151 would output a high-level signal to the D flip-flop 152. At next stage, based the controlling of the clock signal, the synchronous sequential module 16 outputs the high-level signal registered in the D flip-flop 152 to the digital-to-analog convertor 172 by form of the fourth signal, such that the digital-to-analog convertor 172 would correspondingly output a high-level eighth signal. Herein, it is worth noting that the high-level eighth signal is taken as "bit 1" and used as a next input signal of the comparator 151.

On the contrary, when the signal level of the eighth signal ($V_{DAC}$) is outputted by the digital-to-analog convertor 172 is greater than the second signal's ($V_{CT\_LED}$), the comparator 151 outputs a low-level signal to the D flip-flop 152. Subsequently, based the controlling of the clock signal, the synchronous sequential module 16 outputs the low-level signal registered in the D flip-flop 152 to the digital-to-analog convertor 172 by form of the fourth signal, such that the digital-to-analog convertor 172 correspondingly outputs a low-level eighth signal, wherein the low-level eighth signal is taken as "bit 0" and used as a next input signal of the comparator 151. In general, a digital code output by a commercial proximity sensing circuit is a 8-bit code, that means the comparator must finish the above-mentioned comparison process with 8 times for facilitating the proximity sensing device 1 of the present invention output a specific digital code to the control circuit 2.

Figure 7:
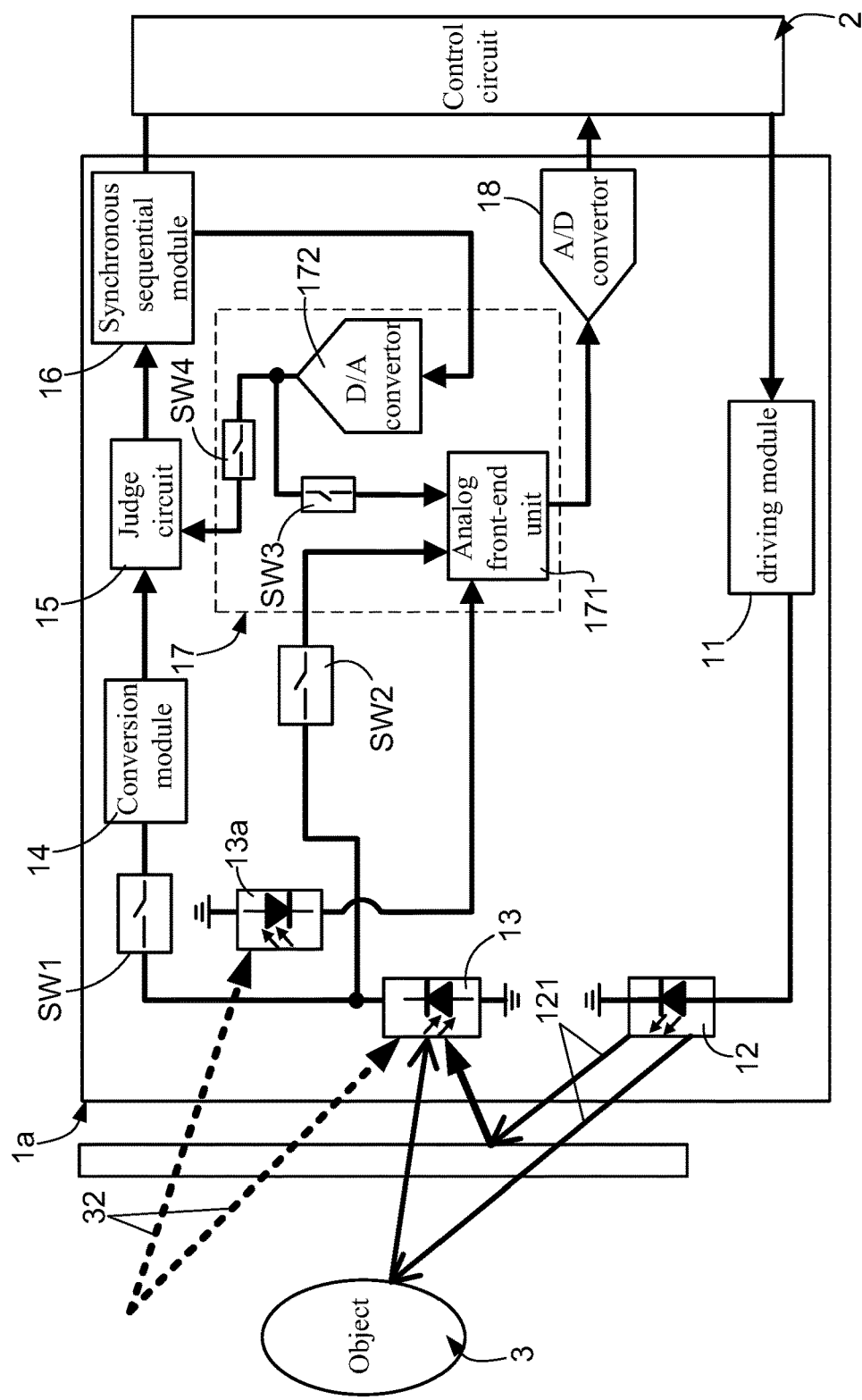
FIG. 7 shows a circuit architecture diagram of an optical sensing circuit having proximity sensing function according to the present invention.

Embodiment for an Optical Sensing Circuit Integrated with the Above-Described Proximity Sensing Device Please refer to FIG. 7, there is illustrated a circuit architecture diagram of an optical sensing circuit having proximity sensing function according to the present invention. As FIG. 7 shows, the said optical sensing circuit 1a mainly comprises: a driving module 11, a lighting element 12, a first light receiving module 13, a second light receiving module 13a, a conversion module 14, a judge circuit 15, a synchronous sequential module 16, an analog front-end module 17, and an analog-to-digital convertor 18.

The connection-ship and arrangements of the driving module 11, the lighting element 12, the first light receiving module 13, the conversion module 14, the judge circuit 15, the synchronous sequential module 16, the analog front-end module 17, and the analog-to-digital convertor 18 have been introduced in above paragraphs. It is worth noting that, comparing with FIG. 3, FIG. 7 particularly shows that the optical sensing circuit 1a further comprises a second light receiving module 13a, which is configured to cooperate with the analog front-end module 17, the analog-to-digital convertor 18, and the control circuit 2 for making a smart phone has an ambient light sensing function, such that the smart phone is able to properly manage the backlight brightness of a touch screen thereof. In addition, for enhancing the precision of the ambient light sensing function, the second light receiving module 13a practically comprises a red light receiving unit, a green light receiving unit and a blue light receiving unit.

The above description is made on embodiments of the present invention. However, the embodiments are not intended to limit scope of the present invention, and all equivalent implementations or alterations within the spirit of the present invention still fall within the scope of the present invention.

What is claimed is:

1. A proximity sensing device, comprising:
   a control circuit;
   a driving module, being coupled to the control circuit;
   a lighting element, being coupled to the driving module for emitting an object-detecting light to an external object based on the controlling of the driving module;
   a light receiving module, being used for receiving a reflective light from the object and an ambient light;
   a conversion module, being coupled to the light receiving module and comprising:
      a signal-amplifying MOSFET, being coupled to a control signal by the gate terminal thereof;
      a current mirror circuit, being configured as an active load of the signal-amplifying MOSFET and comprising a first MOSFET and a second MOSFET; wherein the gate terminal of the first MOSFET is coupled to the gate terminal of the second MOSFET, and the source terminal of the first MOSFET and the source terminal of the second MOSFET being coupled to a bias voltage; moreover, the drain terminal and the gate terminal of the first MOSFET being coupled to each other, and the drain terminal of the second MOSFET being coupled to the source terminal of the signal-amplifying MOSFET;
      N number of cascode MOSFET pairs, wherein each of the cascode MOSFET pairs comprises an upper MOSFET and a lower MOSFET, and the gate terminal and the source terminal of the upper MOSFET being respectively coupled to the gate terminal and the source terminal of the second MOSFET and the bias voltage; moreover, the source terminal and the drain terminal of the lower MOSFET being individually coupled to the drain terminal of the upper MOSFET and the drain terminal of the signal-amplifying MOSFET; furthermore, the gate terminal of the lower MOSFET being coupled to a switch controlling signal; and
      a current-to-voltage converting resistor, being coupled to a common connection point of the drain terminal of the signal-amplifying MOSFET and the drain terminal of the lower MOSFET;
   a judge circuit, being coupled to the common connection point;
   a synchronous sequential module, being coupled to the control circuit and the judge circuit;
   an analog front-end module, being coupled to the synchronous sequential module and the light receiving module, and outputting an analog signal to the judge circuit according to a control signal of the control circuit; and
   an analog-to-digital convertor, being coupled to the analog front-end module and outputting a digital signal to the control circuit.

2. The proximity sensing device of claim 1, further comprising:
   a first switch, being coupled between the light receiving module and the conversion module; and
   a second switch, being coupled between the light receiving module and the analog front-end module.

3. The proximity sensing device of claim 1, wherein the lighting element is a light-emitting diode (LED) or an organic light-emitting diode (OLED), and the control circuit is a microprocessor.

4. The proximity sensing device of claim 1, wherein the judge circuit comprises:
   a comparator, wherein one input terminal of the comparator is coupled to the common connection point in the conversion module, and the other input terminal of the comparator being coupled to the analog front-end module; and
   a D flip-flop, being coupled to the output terminal of the comparator by one signal input terminal thereof, and another one signal input terminal of the D flip-flop being coupled to a clock signal; wherein the synchronous sequential module is coupled to an output terminal of the D flip-flop and the clock signal.

5. The proximity sensing device of claim 2, wherein the analog front-end module comprises:
   an analog front-end unit, being coupled to the light receiving module through the second switch;
   a digital-to-analog convertor, being coupled to the synchronous sequential module;
   a third switch, being coupled between the analog front-end unit and the digital-to-analog convertor, such that the analog front-end unit is coupled to the digital-to-analog convertor through the third switch;
   a fourth switch, being coupled between the digital-to-analog convertor and the judge circuit, such that the judge circuit is coupled to the digital-to-analog convertor through the fourth switch.

6. The proximity sensing device of claim 5, wherein the analog front-end unit comprises two integrators.

7. The proximity sensing device of claim 5, wherein when the first switch and the fourth switch are switched to short circuit as well as the second switch and the third switch are switched to open circuit, the said proximity sensing device being operated in a calibration mode.

8. The proximity sensing device of claim 5, wherein when the first switch and the fourth switch are switched to open circuit as well as the second switch and the third switch are switched to short circuit, the said proximity sensing device being operated in a normal operation mode.

9. An optical sensing circuit having proximity sensing function, being applied in an electronic device with a display and comprising;
   a control circuit;
   a driving module, being coupled to the control circuit;
   a lighting element, being coupled to the driving module for emitting an object-detecting light to an external object based on the controlling of the driving module;
   a first light receiving module, being used for receiving a reflective light from the object and an ambient light;
   a second light receiving module, being used for receiving the ambient light;
   a conversion module, being coupled to the light receiving module and comprising:
      a signal-amplifying MOSFET, being coupled to a control signal by the gate terminal thereof;
      a current mirror circuit, being configured as an active load of the signal-amplifying MOSFET and comprising a first MOSFET and a second MOSFET; wherein the gate terminal of the first MOSFET is coupled to the gate terminal of the second MOSFET, and the source terminal of the first MOSFET and the source terminal of the second MOSFET being coupled to a bias voltage; moreover, the drain terminal and the gate terminal of the first MOSFET being coupled to each other, and the drain terminal of the second MOSFET being coupled to the source terminal of the signal-amplifying MOSFET;

N number of cascode MOSFET pairs, wherein each of the cascode MOSFET pairs comprises an upper MOSFET and a lower MOSFET, and the gate terminal and the source terminal of the upper MOSFET being respectively coupled to the gate terminal and the source terminal of the second MOSFET and the bias voltage; moreover, the source terminal and the drain terminal of the lower MOSFET being individually coupled to the drain terminal of the upper MOSFET and the drain terminal of the signal-amplifying MOSFET; furthermore, the gate terminal of the lower MOSFET being coupled to a switch controlling signal; and a current-to-voltage converting resistor, being coupled to a common connection point of the drain terminal of the signal-amplifying MOSFET and the drain terminal of the lower MOSFET;

a judge circuit, being coupled to the common connection point;

a synchronous sequential module, being coupled to the control circuit and the judge circuit;

an analog front-end module, being coupled to the synchronous sequential module and the light receiving module, and outputting an analog signal to the judge circuit according to a control signal of the control circuit; and an analog-to-digital convertor, being coupled to the analog front-end module and outputting a digital signal to the control circuit.

10. The proximity sensing device of claim 9, further comprising:

a first switch, being coupled between the first light receiving module and the conversion module; and a second switch, being coupled between the first light receiving module and the analog front-end module.

11. The proximity sensing device of claim 9, wherein the lighting element is a light-emitting diode (LED) or an organic light-emitting diode (OLED), and the control circuit is a microprocessor.

12. The proximity sensing device of claim 9, wherein the second light receiving module comprises a red light receiving unit, a green light receiving unit and a blue light receiving unit.

13. The proximity sensing device of claim 9, wherein the judge circuit comprises:

a comparator, wherein one input terminal of the comparator is coupled to the common connection point in the conversion module, and the other input terminal of the comparator being coupled to the analog front-end module; and a D flip-flop, being coupled to the output terminal of the comparator by one signal input terminal thereof, and another one signal input terminal of the D flip-flop being coupled to a clock signal; wherein the synchronous sequential module is coupled to an output terminal of the D flip-flop and the clock signal.

14. The proximity sensing device of claim 10, wherein the analog front-end module comprises:

an analog front-end unit, being coupled to the first light receiving module through the second switch, and simultaneously coupled to the second light receiving module;

a digital-to-analog convertor, being coupled to the synchronous sequential module;

a third switch, being coupled between the analog front-end unit and the digital-to-analog convertor, such that the analog front-end unit is coupled to the digital-to-analog convertor through the third switch;

a fourth switch, being coupled between the digital-to-analog convertor and the judge circuit, such that the judge circuit is coupled to the digital-to-analog convertor through the fourth switch.

15. The proximity sensing device of claim 14, wherein the analog front-end unit comprises two integrators.

16. The proximity sensing device of claim 14, wherein when the first switch and the fourth switch are switched to short circuit as well as the second switch and the third switch are switched to open circuit, the said proximity sensing device being operated in a calibration mode;

a first switch, being coupled between the light receiving module and the conversion module; and a second switch, being coupled between the light receiving module and the analog front-end module.

17. The proximity sensing device of claim 14, wherein when the first switch and the fourth switch are switched to open circuit as well as the second switch and the third switch are switched to short circuit, the said proximity sensing device being operated in a normal operation mode.

\* \* \* \* \*